United States Patent
Beldrighi et al.

(10) Patent No.: US 11,748,767 B2
(45) Date of Patent: Sep. 5, 2023

(54) SYSTEM AND METHOD FOR TRACING AND GUARANTEEING THE QUALITY OF RAW MATERIALS

(71) Applicant: THEMIS S.r.l., Bagnolo Mella (IT)

(72) Inventors: Graziano Beldrighi, Bagnolo Mella (IT); Matteo Molinari, Bagnolo Mella (IT)

(73) Assignee: THEMIS S.R.L., Bagnolo Mella (IT)

( * ) Notice: Subject to any disclaimer, the term of this patent is extended or adjusted under 35 U.S.C. 154(b) by 241 days.

(21) Appl. No.: 17/194,433

(22) Filed: Mar. 8, 2021

(65) Prior Publication Data
US 2022/0215401 A1    Jul. 7, 2022

(30) Foreign Application Priority Data
Jan. 5, 2021    (IT) .................. 102021000000149

(51) Int. Cl.
*G06K 19/06*    (2006.01)
*G06Q 30/018*   (2023.01)

(52) U.S. Cl.
CPC ..... *G06Q 30/018* (2013.01); *G06K 19/06028* (2013.01); *G06K 19/06037* (2013.01)

(58) Field of Classification Search
CPC ....... G06K 19/06028; G06K 19/06037; G06Q 30/018
USPC ........................................ 235/385, 487, 492
See application file for complete search history.

(56) References Cited

U.S. PATENT DOCUMENTS

| | | | | |
|---|---|---|---|---|
| 2003/0158795 | A1* | 8/2003 | Markham | G05B 19/4183 705/28 |
| 2006/0237547 | A1* | 10/2006 | Barenburg | G07G 1/0054 235/487 |
| 2012/0317662 | A1* | 12/2012 | Neo | G06F 21/73 726/34 |
| 2018/0096175 | A1 | 4/2018 | Schmeling et al. | |

FOREIGN PATENT DOCUMENTS

WO    2019246627 A1    12/2019

* cited by examiner

*Primary Examiner* — Paultep Savusdiphol
(74) *Attorney, Agent, or Firm* — Carmel Patent Agency; Robert J. Ballarini

(57) ABSTRACT

A System for tracing and to guaranteeing the quality of raw materials and/or a transfer or exchange includes: an analytical system configured to carry out chemical, and/or chemical-physical and/or physical analysis on raw materials; a label including a code; a reading system of the label configured to transmit and/or connect the code, through a web network, to a data storage system. The data storage system including a list of codes associated with the raw materials; and a list of certificates of analysis of the raw materials. Each code of the list of codes corresponds to a raw material and to one or more certificates analysis of the raw material.

10 Claims, No Drawings

SYSTEM AND METHOD FOR TRACING AND GUARANTEEING THE QUALITY OF RAW MATERIALS

CROSS-REFERENCE TO RELATED APPLICATIONS

This application claims benefit of Italian Patent Application No. 102021000000149, filed Jan. 5, 2021, the entire contents of which are incorporated by reference herein as if fully set forth.

TECHNICAL FIELD

The present invention is placed in the field of systems and methods based both on computer technologies and on objects or devices and physical passages that allow traceability and to guarantee the quality of raw materials.

BACKGROUND

In the modern industrial world, manufacturing companies have always felt the need to be able to trace the path and arrival times of the raw materials necessary for their productions. Furthermore, in addition to these logistical aspects, companies have always had need to guarantee that the quality of raw materials is constant and comprised within certain specifications. To this end, each batch of raw material is accompanied by a certificate of analysis (Certificate of analysis (CoA)), which often takes the form of one or more paper sheets or PDF files that are exchanged between the supplier and the receiving company of said raw material.

It is therefore evident that since the only element that correlates the physical batch of raw material with the relative accompanying analytical documentation is only the batch number, and having said that these are documents that can be easily manipulated fraudulently, it may happen that the actual quality of the exchanged raw material does not correspond to the real one.

Therefore, a problem felt today is that to ensure that each physical batch of raw material univocally corresponds to one or more certificates of analysis that cannot be modifiable or alterable, even intentionally.

The problem of the analytical guarantee is particularly felt especially for cereals, where the water content can have a very heavy impact on the actual costs of the transactions, or, it is also felt in the case of raw material considering industrial wastes as it is mandatory the veracity of the analytical results in order not to incur offences of environmental nature.

Nowadays, blockchain technologies are being developed that allow secure transactions, such as banking transactions. However, taken as such, they do not solve the problem of guaranteeing the quality of raw materials.

WO2019246627 discloses systems and methods to facilitate the transfer of funds using blockchain networks, digitized financial credit (e.g. digital tokens), smart contracts, several financial clearing institutions, preference for push-only transfers (over pull-type transfers) and/or graphic codes, such as QR code.

Merchant 306 can send a QR code request 320 to the funds transfer server 304. Then, the funds transfer server can generate a QR code 322 which can encode information about the transaction. The server can send 324 the QR code to the merchant, who can include it 326 on the invoice to be sent to the customer. For example, the QR code can be printed on a paper invoice or attached or included in an electronic invoice. Then, the merchant 306 can provide 328 the invoice with the QR code to the customer 302. Upon receipt of the invoice, the customer can use an optical sensor of his/her device 310 (for example mobile phone, tablet, computer, etc.) to scan 330 the QR code on the invoice. After the scan, user's device 310 can send a request 332 to the funds transfer server, requesting information on the transaction. Upon receipt of the request, the server can retrieve 334 the transaction information associated with the QR code and send 336 the transaction information to the customer on the display of the user's device 310. The customer can then verify 338 the correctness of information, whether accurate, the customer can proceed with the payment of the invoice, for example by sending approval instructions to the server. If the customer notices that the transaction information is inaccurate, he can notify to the server about this inaccuracy, for example by sending error notices or complaints to the server which will communicate them to the merchant.

US2018096175A1 discloses a distributed manufacturing platform and related techniques that connect designers, manufacturers, couriers, and other entities and simplify the process of manufacturing and supplying products. According to that method, an item is packaged using blockchain-enabled 3D printed packaging used to improve the visibility, efficiency, and cross-border transport of the supply chain. For example, when the shipper authenticates the package at the pick-up point (for example, by scanning a barcode, a QR code or other code), the payment for the shipment can be received in accordance with the established agreement with the courier, which is represented by a blockchain-based data set. Similarly, when the package crosses an international border and has to pay a rate, import tax, VAT or similar, this payment can be automatically issued at the crossing point (for example, in response to the package authentication using QR code or other methods), always in accordance with the established contract on the blockchain. This increases the efficiency and reduces the likelihood of fraud or corruption.

SUMMARY

The problem addressed by the present invention is therefore that of providing a system and a method that allows solving, at the same time, all the aforementioned problems, in other words, which allows tracing and/or guaranteeing the quality of raw materials effectively solving all the situations listed above.

Therefore, the present invention solves the aforementioned problem by means of the system and the methods that employ it as outlined in the attached claims, whose definitions are an integral part of the present description, thus allowing to have a system and methods therefore which allow to avoid fraud or crimes relating to the quality of raw materials, including industrial wastes.

Moreover, as an additional advantage, the proposed solution consists of a system of relatively simple constitution.

Further features and advantages of the system of the invention and of the methods of use will result from the description of the examples of realization of the invention, provided as an indication of the invention.

DETAILED DESCRIPTION OF THE PREFERRED EMBODIMENTS

For the purpose of description of this document, the term "and/or", when used in a list of two or more items, means that any of the listed items can be used alone, or in any combination of two or more of the listed items.

For example, whether a combination is described as containing components A, B and/or C, or, A and/or B and/or C, the composition may contain only A; only B; only C; A and B in combination; A and C in combination; B and C in combination; or A, B and C in combination.

The terms "comprises", "comprising" or any other variation thereof, means to cover a non-exclusive inclusion, so that a system, method, use, etc. which includes a list of elements, that does not only include those elements, but may include other elements not expressly listed or related to that system, method, use, etc.

An element followed by "comprises . . . a . . . " does not prevent, without further constraints, the existence of further identical elements in the system, method or use which comprises the element.

An object of the present invention is a system for tracing and guaranteeing the quality of raw materials and/or the transfer or exchange comprising or, alternatively, consisting of the following elements:
a) an analytical system suitable for carrying out chemical, and/or chemical-physical and/or physical analysis on raw materials,
b) a label comprising a code,
c) a reading system of said label suitable for transmitting and/or connecting said code, through a web network or other similar system, to a data storage system,
d) a data storage system comprising:
   a list of codes associated with these raw materials,
   a list of certificates of analysis of these raw materials;
wherein each code of the list of codes corresponds to a raw material and to one or more certificates of analysis of said raw material.

It was in fact surprisingly found that the system of the invention allows not only to trace the movements of raw materials, but also to effectively guarantee their quality.

Indeed, the object of the invention is therefore a system and a method that allows the exchange of raw materials which, through the management of transactions based on a blockchain system, manages to simultaneously guarantee the execution of operations in logistical terms, the qualitative security (by uploading the analysis and generating a code to be applied to the bill of lading and containers) and financial security, i.e. payment issued automatically by the system once the coincidence between the ordered and received product has been verified, even in qualitative terms.

Logistic security, but especially qualitative, is guaranteed by the analysis management system: the dedicated operator loads the analysis into a blockchain system by generating an identification code which is applied to the bill of lading and containers, so that the buyer is sure of the origin and quality of the wares, simply by framing the code in the bill of delivering and on the containers upon receipt.

Financial security is guaranteed in that the payment, totally or partially, will be released to the seller X from an escrow or through a double transaction, only upon receipt of the ware, in that the smart contract connected to the code and to the platform in general, it allows to automatically release the money once the coincidence between the ordered and received product has been verified.

The system for tracing and guaranteeing the quality of raw materials can also be used to guarantee and/or inform about commercial transactions of raw materials.

The system allows to connect the information about the quality of the material stored in a data storage system also based on the use of the blockchain or other similar system by reading the code of the label, thus connecting the data storage system information with the raw material, then the passage from the label with the code to the raw material.

Raw material means raw materials in general, such as, for example, organic, non-organic raw materials, commodities, food raw materials, cereals, corn, rice, soy, oats, flour, chemical compounds, byproducts, wastewater and/or industrial processing wastes, plastic matters, steel, food ingredients, chemical compositions, food compositions, pharmaceutical compositions, pharmaceutical products, vaccines, semi-finished products and byproducts deriving from a transformation process.

According to a preferred embodiment, the system is suitable for tracing and guaranteeing the quality and/or the transfer or exchange of raw materials, wherein said raw materials are chosen from cereals, corn, rice, soy, oats, flour, chemical compounds, byproducts, waste and/or waste from industrial processing, food ingredients, chemical compositions, food compositions, pharmaceutical compositions, pharmaceutical products, vaccines, semi-finished products and byproducts deriving from a transformation process.

The system of the invention can further comprise a web network or other similar system suitable for transmitting and/or connecting said code to a data storage system.

The system of the invention can further comprise a software and/or an App suitable for managing and/or connecting the various parts of the system.

The web network or other similar system can be a web network or other similar system protected by encryption.

The analytical system of step is chosen between laser or infrared 3D scanner, Liquid Chromatograph HPLC, HPLC/MS, HPLC/MS-MS, Thin-Layer Liquid Chromatography TLC, Gas Chromatograph GC, GLC, GC/MS, GC-HS, IR, FT-IR or UV-Vis spectrophotometer, Mass Spectrometer, Nuclear Magnetic Resonance Spectrometer, Thermogravimetry TGA, Differential Scanning calorimeter DSC, Karl Fischer Titrator, Near Infra-Red Spectrometry (NIR), XRF Spectrophotometry (X-Ray Fluorescence).

According to an embodiment, the label may include an NFC (Near Field Communication) transmitter/receiver.

According to a preferred embodiment, the label can be an adhesive label, which has the characteristic of destroying itself if it is removed and/or of leaving a distinctive mark in case of removal.

According to a more preferred embodiment, the label can be an adhesive label, which comprises a button connected to a communication system, wherein at least the button is placed on part of the adhesive surface of the adhesive label. In this way, when the adhesive label is detached from the raw material or from the container that contains it, the button is released causing the emission of a signal by the communication system which is sent to the data storage system, which records the tampering with the adhesive label.

According to an embodiment, the label can be a tag, for example a tag made of metallic material, which is screwed, welded or riveted onto the raw material or onto the container or container that contains the raw material.

According to a preferred embodiment of the system, the label is an adhesive label, a sewn label, a glued label, a printed label, varnished or painted or fire-branded or stamped with cryptographic ink, or it is a tag.

According to an embodiment of the system, the label is a self-destructing label.

According to a preferred embodiment of the system, the label is a self-destructing adhesive label.

According to a preferred embodiment of the system, the label is a self-destructing label, like an adhesive label, a sewn label, a glued label, a printed, varnished or painted or fire-branded label or stamped with cryptographic ink, or a self-destructing tag.

The label comprises a code, wherein the code is a univocal identifying code. This code can therefore be a one-dimensional and/or two-dimensional and/or alphanumeric code, such as a QR-code, an alphanumeric code, a matrix code, a bar code; and/or is a code is made using cryptographic ink; or it is a code created by fire branding or it is any other code able to identify uniquely a product or item.

According to a preferred embodiment of the system, the code is a code made by means of cryptographic ink of the QR-code type, alphanumeric code, matrix code or bar code.

According to a more preferred embodiment of the system, the code is a code made by means of QR-code type cryptographic ink.

According to a more preferred embodiment of the system, the label is an adhesive label, a glued label, a printed label, a label stamped with cryptographic ink, or it is a tag and the code is a QR-code, an alphanumeric code, a matrix code, a bar code; and/or is a code made by cryptographic ink.

The code, in addition to being present on the label or in the label, is also present in a data storage system.

The label, in addition to the code, can further comprise a NFC transmitter/receiver suitable for transmitting to a reading system able to receive NFC information, in particular, able to receive the code.

The reading system can be a mobile device, able to receive NFC information, such as for example a Tablet, a Smartphone, preferably a smartphone.

In the case that the reading system is a mobile device, the information retrieved from the data storage system about tracing and quality can be directly displayed on said mobile device, when it is placed in proximity of the raw material.

Therefore, for example, the user can place the mobile device near to the label placed on the raw material or on the container that contains it, the label will transmit the code to the mobile device via NFC and, through the code, the mobile device, transmitting and/or connecting to the data storage system will show information about the tracing and quality of the raw material.

For example, it will be sufficient to place the mobile device, for example the Smartphone, near to a barrel or container containing the raw material to know, through the system of the invention, what is the quality of said raw material, i.e. to know one or more certificates of analysis of said raw material. Or, it will be sufficient to place the mobile device, for example the Smartphone, near to a barrel or container containing the raw material to know, through the system of the invention, the transactions and/or physical movements that said material has undergone.

The reading system of said label suitable for transmitting and/or connecting said code, through a web network or other similar system, to a data storage system, it can be a reader of codes, for example a laser scanner or a NFC reader or receiver.

The reading system can be a mobile device, able to read codes, for example bar codes, QR-Code, matrix codes, such as a Tablet, and it can be for example a Smartphone, preferably it is a smartphone.

The data storage system can be the internal memory or the Hard-Disc of a server, a computer, a mobile device, a PC, etc.

The data storage system can also be part of an IT platform, hereinafter referred to as platform.

Preferably, the data storage system is a blockchain data storage system.

Preferably the data storage system is part of a blockchain platform. More preferably, this data storage system is the closed central or smart-lock type.

This data storage system allows accessing and finding information regarding that specific raw material.

The data storage system comprises one or more records, wherein each record comprises at least the following two fields:
  code, and/or
  one or more certificates of analysis.

The platform can be a web platform, and/or as an auxiliary system applicable through API (application programming interface) to third-party sites or plug-in to platforms, e-commerce or other online activities that have as their object the buying and selling (or other exchange of ownership) of real estate, in particular, raw materials.

This information therefore includes the analytical certificates of the considered raw material.

The certificates of analysis can be issued by the producer of the raw material or by third parties.

Certificates of analysis may comprise the results of one or more of the following analysis:
  laser or infrared 3D scanning, or by other machineries or such to detect the shape of the raw material,
  HPLC, HPLC/MS, HPLC/MS-MS, TLC, GC, GLC, GC/MS, GC-HS analysis, IR, FT-IR or UV-Vis spectrophotometry, Mass Spectrometry, Nuclear Magnetic Resonance, TGA, DSC, Residual ash content; loss on drying (LOD), water content, Karl Fischer (KF); Near Infra-Red (NIR) Spectrometry, XRF Spectrophotometry (X-Ray Fluorescence);
  organoleptic analysis (tactile, olfactory, visual).

The system therefore allows to guarantee the quality of raw materials and prevent them counterfeiting through a constantly updated data archiving system available for consultation which allows, with full transparency, to verify the analytical results, i.e. the certificates of analysis to guarantee the quality of the raw material, as above described.

The Determination of quality of the raw material through the use of one or more of the techniques listed above is particularly useful in the case of food raw materials or industrial processing wastes.

This invention guarantees that it is possible to combine uniquely one or more certificates of analysis with a raw material without the possibility that this certificate of analysis (CoA) will be exchanged or modified.

Through the blockchain system it is possible to create a platform that allows managing the certificates of analysis of raw material. The blockchain is indeed able to contain univocal information about the raw material.

Another object is a method for tracing and guaranteeing the quality of raw materials by means of the system above described comprising or, alternatively, consisting of the following steps:
  a) providing the above described system,
  b) carrying out one or more chemical and/or chemical-physical and/or physical analysis on a raw material and producing one or more certificates of analysis
  c) producing in the data storage system a record comprising:
    a code associated with a raw material,
    one or more certificates of analysis of the raw material,
  wherein each code corresponds to a raw material and to one or more certificates of analysis of said raw material;
  d) producing a label comprising the code of step c), e) applying the label of step d) on the bill of lading or delivering and/or on the container containing said raw material, f) reading, via a reading system, said label and transmitting said code, through a web network or other similar system, to the data storage system, g) returning, via the data storage system, the tracing and the certificate(s) analysis of said raw material.

Step d) can be carried out by printing, including or stamping the code in or on the label and/or on the raw material itself or on the container of the raw material.

With regard to the transfers of ownership of the raw material, it is considered, by way of example, the situation wherein the raw material is owned by Tizio and he wants to sell it to Caio. Caio on the platform will send a purchase proposal to Tizio (or vice versa), if accepted by Tizio, he sends the raw material to Caio, while the money is kept by the platform as an escrow or double transaction. Once the raw material has been received, Caio frames the code or enters it in the data storage system, in this way the platform manages, manually or automatically, the transfer of information about the ownership of the raw material (Smart Contract) and, if chosen, also the transfer of money to Tizio.

Therefore, according to an embodiment, the above-mentioned method may comprise the following further steps to manage the transfer of ownership from seller X to the purchaser Y:

h) the purchaser Y sends a purchase proposal to seller X or seller X sends a sale offer to purchaser Y, i) optionally, if the purchase proposal or the sale offer is accepted respectively by seller X or by the purchaser Y, the purchaser Y deposits the compensation in cash (or crypto currencies, or barter, exchange of wares for titles or any other form of economic exchange or free-contract) into the platform and/or plug-in by way of escrow and/or double buying and selling, and/or sale with reserve property agreement, loan for use, rental and/or leasing and/or rent or buy, franchising or any other type of contract also concluded with smart contract method, j) if the purchase proposal or the sale offer is accepted respectively by seller X or by purchaser Y, seller X sends the raw material comprising the label comprising a code, to the purchaser Y, k) when the raw material has been received, the purchaser Y, by means of a reading system of said label, transmits said code, through a web network or other similar system, to the data storage system, l) the data storage system is then updated, manually or automatically, with regard to the transfer of ownership of good from seller X to owner Y;

m) optionally, the platform releases to seller X the money which, by way of escrow and/or double buying and selling, and/or sale with reserve property agreement, loan for use, rental and/or leasing and/or rent or buy, franchising or any other type of contract also concluded with smart contract method, the purchaser Y had deposited into the platform and/or plug-in.

In step b) the chemical and/or chemical-physical and/or physical analysis of step b) is chosen from:
laser or infrared 3D scanning, or by other machineries or such as to detect the shape of the raw material,
HPLC, HPLC/MS, HPLC/MS-MS, TLC, GC, GLC, GC/MS, GC-HS analysis, IR, FT-IR or UV-Vis spectrophotometry, Mass Spectrometry, Nuclear Magnetic Resonance, TGA, DSC, Residual ash content; loss on drying (LOD), water content, Karl Fischer (KF); Near Infra-Red (NIR) Spectrometry, XRF Spectrophotometry (X-Ray Fluorescence);
organoleptic analysis (tactile, olfactory, visual).

According to a preferred embodiment, in step b) the analysis of the water content is carried out by determination of the Karl Fischer (KF) value.

According to a preferred embodiment of the above-mentioned method, the organoleptic analysis is carried out by visual and/or olfactory and/or tactile analysis. Another object is the use of a system as above described, including the forms of preferred embodiment, to guarantee the quality of raw materials or to guarantee the traceability and quality, and/or transfer or exchange, of raw materials.

According to an embodiment, the use of a system as above described is preferred, including the preferred embodiments, to guarantee the quality of raw materials or to guarantee the traceability and quality of raw materials.

A further object is a method for identifying the contents of a container comprising or, alternatively, consisting of the following steps:

a1) providing the system as described above, b1) carrying out one or more chemical and/or chemical-physical and/or physical analysis on a raw material and producing one or more certificates of analysis, c1) producing in the data storage system a record comprising:
a code associated with a raw material,
one or more certificates of analysis of the raw material, wherein each code corresponds to a raw material and to one or more certificates of analysis of said raw material;

d1) producing a label comprising the code of step c1), e1) applying the label of step d1) on the container containing said raw material, f1) by means of a reading system reading said label and transmitting said code, through a web network or other similar system, to the data storage system, g1) the data storage system returns the contents of the container in terms of the name of the raw material, and, optionally, one or more certificates of analysis of the material.

Indeed, this method allows determining in a very simple, immediate, and not expensive, unambiguously and without the possibility of frauds, the contents of a container containing one or more raw materials.

This last method of applying of the method of the present invention allows therefore the fast check of the goods contained in containers, for example, at the Customs, ports, airports, etc.

Another object is the use of a system as above described, including the forms of preferred embodiments, for identifying the contents of a container, in particular in terms of raw material(s).

From the above description they are evident the advantages of the system of the present invention, which, albeit in its relatively simple implementation, solves many problems simultaneously, with one and only one system.

The invention claimed is:

1. System for tracing and guaranteeing the quality of raw materials and a transfer or exchange of the raw materials, the system comprising:
an analytical system configured to carry out chemical, and/or chemical-physical and/or physical analysis on raw materials,
a label comprising a code, a reading system of said label configured to transmit and/or connect said code, through a web network, to a data storage system, the data storage system comprising:
a list of codes associated with the raw materials,
a list of certificates of analysis of the raw materials, the certificates of analysis being generated based on analyses carried out by the analytical system;
wherein each code of the list of codes corresponds to a raw material and to one or more certificates of analysis of said raw material.

2. The system according to claim 1, wherein the analytical system is selected from the group consisting of: laser 3D scanner, infrared 3D scanner, Liquid Chromatograph HPLC, HPLC/MS, HPLC/MS-MS, Thin-Layer Liquid Chromatography TLC, Gas Chromatograph GC, GLC, GC/MS, GC-HS, IR, FT-IR or UV-Vis spectrophotometer, Mass Spectrometer, Nuclear Magnetic Resonance Spectrometer, Thermogravimetry TGA, Differential Scanning Calorimeter DSC, Karl Fischer Titrator, Near Infra-Red Spectrometry (NIR), and XRF Spectrophotometry (X-Ray Fluorescence).

3. The system according to claim 1, wherein the label is an adhesive label, a glued label, a printed label, a label stamped with cryptographic ink, or is a tag and wherein the code is a QR-code, an alphanumeric code, a matrix code, a barcode; or is a code made by cryptographic ink; or the label is a tag fastened to the raw material or onto a container that contains the raw material.

4. The system according to claim 1, wherein the label is an adhesive label, which comprises a button connected to a communication system, wherein the button is placed on part of the adhesive surface of the adhesive label.

5. The system of claim 1, wherein said raw materials are selected from the group consisting of: cereals, corn, rice, soybeans, oats, flour, chemical compounds, byproducts, waste, waste from industrial processing, food ingredients, chemical compositions, food compositions, pharmaceutical compositions, pharmaceutical products, vaccines, semi-finished products and byproducts deriving from a transformation process.

6. Method for tracing and guaranteeing the quality of raw materials comprising:
a) providing the system according to claim 1,
b) carrying out at least one chemical, chemical-physical or physical analysis on a raw material and producing at least one certificates of analysis,
c) producing in the data storage system a record comprising:
a code associated with a raw material,
at least one certificate of analysis of the raw material,
wherein each code corresponds to the raw material and to the at least one certificate of analysis of said raw material;
d) producing a label comprising the code of step c),
e) applying the label of step d) on a bill of lading or delivering or on a container containing said raw material,
f) reading, via a reading system, said label and transmitting said code, through a web network, to the data storage system,
g) returning, via the data storage system, the tracing and the at least one certificate of analysis of said raw material.

7. The method according to claim 6 further comprising:
managing a transfer of ownership a seller X to a purchaser Y, wherein:
h) the purchaser Y sends a purchase proposal to the seller X or the seller X sends a sale offer to purchaser Y,
i) if the purchase proposal or the sale offer is accepted respectively by the seller X or by the purchaser Y, the purchaser Y deposits the compensation into the platform and/or plug-in by way of escrow,
j) if the purchase proposal or sale offer is accepted respectively by the seller X or by purchaser Y, the seller X sends the raw material comprising the label comprising a code, to the purchaser Y,
k) when the raw material has been received, the purchaser Y, by means of a reading system of said label, transmits said code, through a web network or other similar system, to the data storage system,
l) the data storage system is then updated, manually or automatically, with regard to the transfer of ownership of good from the seller X to purchaser Y;
m) the platform releases to the seller X the money that, by way of escrow or double transaction, the purchaser Y had deposited into the platform and/or plug-in.

8. The method according to claim 6, wherein the chemical, chemical-physical or physical analysis of step b) is selected from the group consisting of: laser 3D scanning, infrared 3D scanning, contact 3D scanning, HPLC, HPLC/MS, HPLC/MS-MS, TLC, GC, GLC, GC/MS, GC-HS analysis, IR, FT-IR or UV-Vis spectrophotometry, Mass Spectrometry, Nuclear Magnetic Resonance, TGA, DSC, Residual ash content; loss on drying (LOD), water content, Karl Fischer (KF); Near Infra-Red (NIR) spectrometry, and XRF (X-Ray Fluorescence) spectrophotometry, and organoleptic analysis (tactile, olfactory, visual).

9. Method for identifying the contents of a container comprising:
a1) providing the system according to claim 1,
b1) carrying out at least one chemical, chemical-physical or physical analysis on a raw material and producing at least one certificate of analysis,
c1) producing in the data storage system a record comprising:
a code associated with a raw material,
at least one certificate of analysis of the raw material,
wherein each code corresponds to a raw material and at least one certificate of analysis of said raw material;
d1) producing a label comprising the code of step c1),
e1) applying the label of step d1) on the container containing said raw material,
f1) reading, via a reading system, said label and transmitting said code, through a web network, to the data storage system,
g1) returning, via the data storage system, the contents of the container in terms of the name of the raw material, and/or at least one certificate of analysis of the raw material.

10. Use of the system according to claim 1 to guarantee the quality of raw materials or to guarantee the traceability and quality of raw materials or to identify the contents of a container.

* * * * *